United States Patent [19]

Koslowski et al.

[11] Patent Number: 5,227,100
[45] Date of Patent: Jul. 13, 1993

[54] PROCESS FOR PRODUCING GYPSUM BUILDING MATERIALS

[75] Inventors: Thomas Koslowski, Aachen; Klaus M. Hessler, Herzogenrath; Olaf Musebrink, D-Ubach-Palenberg; Joachim Kieker, Wegberg, all of Fed. Rep. of Germany

[73] Assignee: Sicowa Verfahrenstechnik fur Baustoffe GmbH & Co. KG, Fed. Rep. of Germany

[21] Appl. No.: 805,492

[22] Filed: Dec. 10, 1991

[30] Foreign Application Priority Data

Dec. 10, 1990 [DE] Fed. Rep. of Germany ....... 4039319

[51] Int. Cl.$^5$ .................... B28B 3/00; B28B 5/00; B28B 11/14; C04B 40/00
[52] U.S. Cl. ......................... 264/26; 264/37; 264/42; 264/82; 264/145; 264/160; 264/163; 264/297.1; 264/297.9; 264/333; 264/336
[58] Field of Search ............... 264/41, 42, 44, 37, 264/39, 82, 25-27, 45.3, 145, 148, 157, 160, 163, 333, 336, 297.1, 297.9

[56] References Cited

U.S. PATENT DOCUMENTS

| | | | |
|---|---|---|---|
| 3,758,319 | 9/1973 | Ergene | 264/42 X |
| 4,040,850 | 8/1977 | Kyri et al. | 106/673 |
| 4,057,608 | 11/1977 | Hashimoto et al. | 264/42 |
| 4,211,571 | 7/1980 | Hartmann et al. | 264/42 X |
| 4,221,598 | 9/1980 | Doblinger | 264/42 X |
| 4,239,716 | 12/1980 | Ishida et al. | 264/86 |
| 4,376,086 | 3/1983 | Schubert et al. | 264/42 |
| 4,445,937 | 5/1984 | Bassier et al. | 106/782 X |
| 4,455,271 | 6/1984 | Johnson | 264/42 |
| 4,673,543 | 6/1987 | Akasaka et al. | 264/42 X |
| 4,734,163 | 3/1988 | Eberhardt et al. | 264/82 X |
| 5,093,093 | 3/1992 | Koslowski | 106/786 X |

FOREIGN PATENT DOCUMENTS

| | | |
|---|---|---|
| 1571575 | 6/1966 | Fed. Rep. of Germany . |
| 2442021 | 9/1974 | Fed. Rep. of Germany ............ 21/2 |
| 2546181 | 10/1975 | Fed. Rep. of Germany ............ 25/4 |
| 2548912 | 10/1975 | Fed. Rep. of Germany ............ 15/2 |
| 2740018 | 3/1979 | Fed. Rep. of Germany . |
| 351805 | 10/1972 | U.S.S.R. ............................ 264/42 |

Primary Examiner—Karen Aftergut
Attorney, Agent, or Firm—Townsend and Townsend Khourie and Crew

[57] ABSTRACT

A process for producing lightweight, panel or block-shaped gypsum building materials with a pore structure, in particular wall panels, wherein calcium sulphate alpha-hemihydrate, water in a slightly more than stoichiometric quantity, setting retarders and/or accelerators and additives are mixed to form a pourable suspension and subjected to suitable forming. The ground calcium sulphate alpha-hemihydrate, having a Blaine specific surface area greater than 2000 cm$^2$/g, is combined if appropriate, with calcium sulphate beta-hemihydrate in a quantity of up to about 30% by weight relative to the calcium sulphate alpha-hemihydrate, and mixed before forming with a surfactant foam of a defined apparent density in the range from 40 to 80 kg/m$^3$ and a uniform defined pore size, in a quantity for adjusting the apparent density of the gypsum building material to a defined value in the range from 300 to 1200 kg/m$^3$.

22 Claims, 1 Drawing Sheet

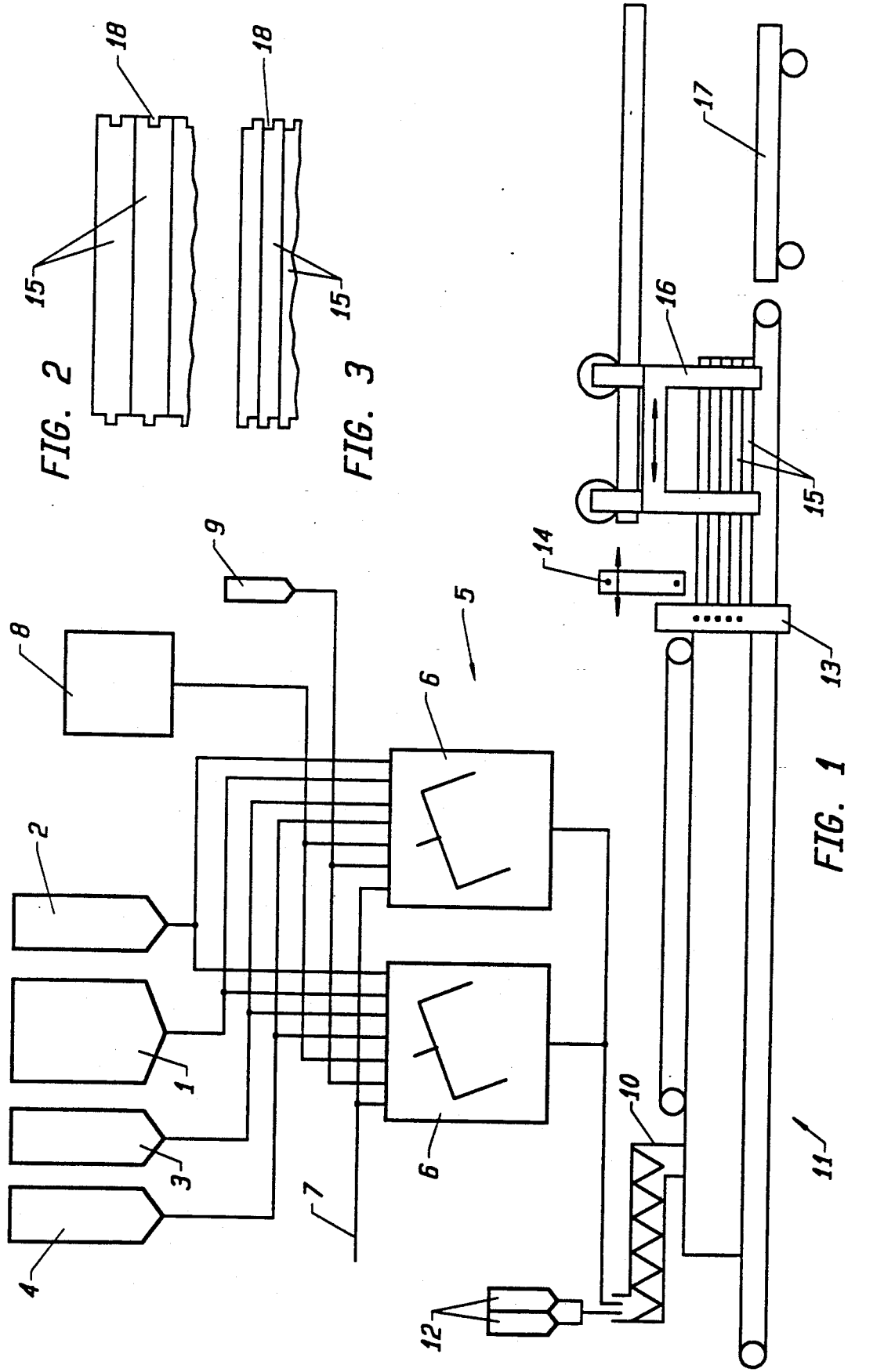

PROCESS FOR PRODUCING GYPSUM BUILDING MATERIALS

BACKGROUND OF THE INVENTION

The invention relates to a process for producing lightweight, panel- or block-shaped gypsum building materials, in particular wall panels provided with a porous structure, wherein calcium sulphate alpha-hemihydrate, water in a slightly more than stoichiometric quantity and, if appropriate, setting retarders and/or accelerators for gypsum and additives are mixed to form a pourable suspension and formed into a desired shape.

German Offenlegungsschrift 1,571,575, describes a process for producing gypsum building materials in which unground calcium sulphate alpha-hemihydrate is used as gypsum, with which a pourable suspension is formed, to which calcium carbonate is added and reacted with sulfuric acid to produce carbon dioxide. The gas bubbles thus generated in the suspension lead to a pore structure in the finished product. Such a generation of gas bubbles in the suspension, however, leads to problems with respect to a uniform distribution thereof over the cross-section, in particular since the gas bubbles tend to rise and the gypsum particles tend to sediment, so that the quality of the porous gypsum products in impaired. To reduce this problem, the sulfuric acid is added immediately before pouring, so that the gas bubbles form substantially in the poured suspension, which thus expands in the mould. In addition, it is pointed out that preformed foams do not give good results in this connection, since they retard setting and thus have time to collapse, and the viscosity is impaired.

According to the German Offenlegungsschrift 2,442,021, anhydride is used as gypsum, while gas is generated in the suspension produced by catalytic decomposition of hydrogen peroxide. The porosified suspension is poured into moulds before the maximum expansion has been reached. Apart from the fact that anhydride does not lead to strengths as high as those obtained with calcium-sulphate alpha-hemihydrate, problems here again result from the rising of gas bubbles and sedimenting of gypsum particles.

In addition, it is known from German Offenlegungsschrift 2,546,181 to add a foaming agent to a suspension of gypsum, water and additives in the presence of a foam-stabilizing additive and to foam up the mixture. Such foaming-up, however, does not lead to a substantially uniform and maintainable mean foam pore size but, instead, these sizes fluctuate within a wide range, so that there are pores from sink hole size down to fine pores, whereby the density and quality of the foamed gypsum products produced are impaired.

It is known from German Offenlegungsschrift 2,740,018 to use calcium sulphate alpha-hemihydrate together with a proportion of dihydrate and to foam up the suspension using an added foam former, the dihydrate being intended to prevent a coalescence of foam bubbles. Since, however, the foam is generated in the suspension, a well defined pore size and number of pores cannot be set, with the result that the end products show corresponding fluctuations in density and quality.

Finally, it is known from German Offenlegungsschrift 2,548,912 to prepare, in a mixer, an aqueous surfactant foam of a structure which is complicated due to the use of chemicals used in addition to the surfactant, gypsum in the form of, for instance, hemihydrates then being added to the foam. The additional chemicals are intended to serve for stabilization of the foam.

SUMMARY OF THE INVENTION

The present invention provides a process by which lightweight gypsum building materials can be produced with air pores of substantially constant size in as uniform as possible a distribution, coupled with high strength and a predetermined apparent density of the product.

This is achieved by using ground calcium sulphate alpha-hemihydrate having a Blaine specific surface area greater than 2000 $cm^2/g$, preferably about 3000 to 4000 $cm^2/g$, together, in some embodiments, with calcium sulphate beta-hemihydrate in a quantity of up to about 30% by weight, preferably 5 to 20% by weight, relative to the calcium sulphate alpha-hemihydrate, and a previously prepared surfactant foam of a defined apparent density in the range from 40 to 80 $kg/m^3$ and a uniform defined pore size, wherein the foam is mixed into the suspension before forming in a quantity for adjusting the apparent density of the gypsum building material to a defined value in the range from 300 to 1200 $kg/m^3$, preferably 400 to 800 $kg/m^3$, especially 500 to 600 $kg/m^5$.

The use of ground calcium sulphate alpha-hemihydrate having a Blaine specific surface area greater than 2000 $cm^2/g$ leads to a sufficiently high reactivity of the gypsum and to particle sizes which allow the use of a previously prepared surfactant foam with a defined apparent density in the range from 40 to 80 $kg/m^3$ and a virtually uniform, defined pore size (the pore diameters have a relatively narrow Gaussian distribution). The surfactant foam is mixed with the suspension before pouring, without stabilizing additives being necessary and without there being a risk of the foam prematurely collapsing or being crushed. In addition, sedimentation effects and thixotropy effects are eliminated by grinding the calcium sulphate alpha-hemihydrate, which effects high final strengths. The quantity of foam added depends on the desired apparent density of the end products, which is thereby adjusted to a desired value in the range from 300 to 1200 $kg/m^3$, preferably 400 to 800 $kg/m^3$, especially 500 to 600 $kg/m^3$, by considering the solids content, the water required for setting and the corresponding quantity of foam, since the process allows exact dosage. This results in a homogeneous product of good and uniform strength and a predetermined apparent density.

Water is added to the mixture in the least possible excess over the stoichiometric quantity, preferably so as to set a spreading dimension analogously to DIN 1164, which is 20 cm or slightly greater, with at most 1.5 times the stoichiometric quantity. This small quantity of water insures the formation of few if any water pores in the webs which surround the air pores in the end product, which might impair its strength. In addition, drying the gypsum material after release from the mould is thereby minimized, if necessary at all.

Calcium sulphate beta-hemihydrate can be used in a quantity of up to about 30% by weight, preferably 5 to 20% by weight, relative to calcium sulphate alpha-hemihydrate. Since the calcium sulphate beta-hemihydrate is in the form of very fine particles, it promotes the creaminess of the suspension formed and, in the case of relatively coarse calcium sulphate alpha-hemihydrate (down to the lower limit of the specific surface area), serves to stabilize the suspension.

If a previously prepared surfactant foam with coarser pores is used, calcium sulphate alpha-hemihydrate of coarser grain size can also be used without crushing the foam pores or causing sedimentation phenomena to occur. Finer foam pores demand a finer grain size of the calcium sulphate alpha-hemihydrate. A surfactant foam having a uniform pore size, that is to say a pore size having only a narrow range of variation, in the range from 100 to 500 $\mu$m, especially 150 to 200 $\mu$m, is advantageous. The surfactant used can, for example, be sodium dodecylsulphate. Advantageously, the foam is produced by means of a foam gun at a defined water-/surfactant/air ratio and a defined foaming length, so that a substantially uniform pore size results.

Waste and grinding dust arising in the production of the gypsum building materials can be re-used for preparing the suspension.

The suspension can be cast either continuously to give a strand, which is transported in its longitudinal direction and cut after appropriate solidification, or in moulds. Before casting, the suspension can be mixed with an additive consisting of accelerator(s) and/or retarder(s) which control the solidification characteristics. Additives which can be used are lean materials, fillers, dyestuffs, wetting agents and/or aggregates.

For load-bearing building components, it is advantageous, depending on the intended application, to replace up to about 90% by weight of gypsum, that is to say calcium sulphate alpha- and if appropriate beta-hemihydrate by a substitute in the form of ground blast furnace slag, sand and/or lignite ash and/or bituminous coal ash and/or fluidised bed ash, the substitutes preferably having a Blaine specific surface area greater than 3000 cm$^2$/g. The blast furnace slag, sand and/or the ash can also be used together with ground silica. In particular, a lime carrier in the form of hydrated lime, Portland cement or the like, which contributes to the corresponding reactivity of the ground blast furnace slag, sand or of the ash, is then added for alkalization of the suspension in a small quantity, preferably in a quantity from 3 to 15% by weight.

Thus, 10 to 25% by weight of calcium sulphate alpha-hemihydrate can preferably be used together with 90 to 75% by weight of ground blast furnace slag, sand and/or ash and, if appropriate, ground silica and hydrated lime, the latter in an additional quantity of 3 to 15% by weight, for the production of blanks which obtain their early strength by the calcium sulphate alpha-hemihydrate. These blanks can be handled and stacked, are transportable and can be introduced into an autoclave, where they are exposed to a treatment with saturated steam under a pressure of up to 16 bar and a temperature of up to about 200° C. for 4 to 8 hours, so that calcium hydrosilicate phases form which provide the final strength.

100 parts by weight of gypsum can also be used with up to 120 parts by weight of aggregates, if appropriate, together with a lime carrier. In this case, a heat treatment of the gypsum building material released from the mould is then advantageous, wherein the gypsum building material is subjected to a treatment with saturated steam under atmospheric pressure, especially at about 70 to 100° C. for 4 to 8 hours, to an autoclave treatment preferably for 4 to 8 hours at a temperature of up to about 140° C., or to the action of heating generated by a high-frequency field, preferably in the range from about 70° to 100° C.

In general, it is advantageous to subject the gypsum building material released from the mould with a gypsum/substitute weight ratio below about 1:1 to one of the three above mentioned heat treatments and, with a gypsum/substitute weight ratio above about 1:1, to an autoclave treatment under a pressure of up to about 16 bar and a temperature of up to about 200° C. for 4 to 8 hours.

If desired, ground pumice and/or trass can also be used in combination with lime carriers, for instance hydrated lime. Preferably, these have, like the ashes mentioned, a specific surface area of that indicated for blast furnace slag and/or sand.

A further understanding of the nature and advantages of the invention may be realized by reference to the remaining portions of the specification and the drawings.

BRIEF DESCRIPTION OF THE DRAWINGS

FIG. 1 diagrammatically shows an installation for carrying out the process of the present invention for producing wall panels.

FIG. 2 shows details of one possible embodiment of the side edges of the wall panels produced by means of the installation of FIG. 1.

FIG. 3 shows a second possible embodiment of the side edges of the wall panels produced by means of the installation of FIG. 1.

DESCRIPTION OF SPECIFIC EMBODIMENTS

The installation shown in FIG. 1 comprises a stock tank 1 for calcium sulphate alpha-hemihydrate having a Blaine specific surface area greater than 2000 cm$^2$/g, a stock tank 2 for calcium sulphate beta-hemihydrate, a stock tank 3 for ground blast furnace slag and/or sand and a stock tank 4 for hydraulically reactive ash. The stock tanks 1 to 4 are connected via appropriate lines to a tandem mixer 5 (in place of which a mixer with a downstream stock tank for the foamed mixture to be cast can also be used) whose mixing units 6 run alternately. Water is fed to the mixing units 6 via a line 7, and these are also connected to a foam gun 8 for producing a surfactant foam having a substantially uniform, predetermined pore size and a predetermined apparent density. In addition, a retarder for gypsum can be added from an appropriate stock tank 9 to the particular mixer unit 6.

Water in a slightly more than stoichiometric quantity is added to a mixer unit 6 together with a predetermined quantity of retarder, whereupon predetermined quantities of solids from the stock tanks 1 to 4 are added and mixed with one another to give a suspension. Finally, a predetermined quantity of surfactant foam from the foam gun 8 is mixed in. The finished mix is transferred via a conveyor 10, for example a screw conveyor, into a channel of a continuous casting unit 11 formed with appropriate conveyor belts. At the inlet of the conveyor 10, an additive, consisting of one or more accelerators and/or one or more retarders for the mix, can be added from corresponding stock tanks 12 under fine control for controlling the solidification characteristics of the mix. The strand formed by casting into the channel is transferred in its longitudinal direction and, at the end of the channel where it has reached an adequate strength, cut horizontally by a severing device 13. A cutting device 14, which runs along in the direction of conveyance of the stand and can be returned to a starting position, serves for vertical severing of the issuing strand to give a stack of panels 15 which is then gripped by a transfer device 16 and set down on a carriage 17. Depending on whether blast furnace slag, sand and/or ash were or were not used for the production, the stacks on the carriage 17 are taken to an appropriate after treatment and/or, if appropriate, packed after prior grinding.

Simultaneously with the horizontal severing of the solidified, but not yet fully hardened, strand, appropriate grooves 18 can be milled into the side, so that the wall panels 14 can be assembled via groove-and-tongue engagement or the like.

During the production of the strand, an appropriate reinforcement for the gypsum building components can also be introduced, if this is desired. For this purpose, ground waste paper, a fiber pulp of cellulose and waste paper, mineral and/or glass fibers or other reinforcements, fabrics or mats can be used, in order to achieve an improvement in the bending tensile strength, extraction strength and nailing ability.

While the above is a complete description of the preferred embodiments of the invention, various alternatives, modifications, and equivalents may be used. Therefore, the above description should not be taken as limiting the scope of the invention which is defined by the appended claims.

What is claimed is:

1. A process for producing lightweight, high-strength panel- or block-shaped gypsum building materials with a predetermined apparent density and with a porous structure having a uniform distribution of pores, which pores are of substantially constant size, comprising the steps of:
   preparing a surfactant foam of a defined apparent density in a range from 40 to 80 kg/m$^3$ and having a substantially uniform defined pore size;
   mixing separately from said surfactant foam calcium sulphate alpha-hemihydrate having a Blaine specific surface are greater than 2000 cm$^2$/g and water in a quantity slightly more than a stoichiometric quantity of water to form a pourable suspension substantially free of foam;
   thereafter mixing said surfactant foam into said suspension in a quantity for adjusting said predetermined apparent density of said gypsum building material to a defined value in a range from 300 to 1200 kg/m$^3$; and
   forming said mixture of said surfactant foam and said suspension into a desired shape, wherein said mixture solidifies into said lightweight, high-strength, panel- or block-shaped gypsum building material having said porous structure and said predetermined apparent density.

2. The process according to claim 1 wherein said surfactant foam has a uniform pore size in a range from 100 to 500 µm.

3. The process according to claim 1 wherein said step of preparing a surfactant foam includes using a foam gun at a defined water/surfactant/air ratio and a defined foaming length.

4. The process according to claim 1 wherein said quantity of water in said step of mixing calcium sulphate alpha-hemihydrate and water is less than about 1.5 times said stoichiometric quantity such that said mixture has a spreading dimension of about 20 cm.

5. The process according to claim 1 wherein said step of forming comprises casting said mixture in a continuous strand which is cut into desired lengths after solidification.

6. The process according to claim 1 wherein said step of forming comprises casting said mixture in moulds.

7. The process according to claim 5 further comprising combining an additive with said mixture, said additive comprising at least one substance selected from the group consisting of accelerators and retarders to control the solidification characteristics of said mixture.

8. The process according to claim 6 further comprising combining an additive with said mixture, said additive comprising at least one substance selected from the group consisting of accelerators and retarders to control solidification characteristics of said mixture.

9. The process according to claim 1 wherein said step of mixing calcium sulphate alpha-hemihydrate and water includes adding waste material from previously-formed gypsum building material to create said suspension.

10. The process according to claim 6 further comprising removing said gypsum building material from said moulds and drying said gypsum building material after said step of forming.

11. The process according to claim 1 wherein in said step of mixing calcium sulphate alpha-hemihydrate and water, up to about 90% by weight of said calcium sulphate alpha-hemihydrate is replaced by a substitute comprised of at least one substance selected from the group consisting of ground blast furnace slag, sand, lignite ash, bituminous coal ash, fluidised-bed ash, and ground silica.

12. The process according to claim 11 wherein said substitute has a Blaine specific surface area greater than about 3000 cm$^2$/g.

13. The process according to claim 11 wherein 75% to 90% by weight of said calcium sulphate alpha-hemihydrate is replaced by said substitute.

14. The process according to claim 11 wherein said step of mixing said calcium sulphate alpha-hemihydrate and water further includes adding a lime carrier in a quantity of about 3% to 15% by weight of a quantity of calcium sulphate alpha-hemihydrate and water together combined.

15. The process according to claim 11 further comprising the step of heat treating said gypsum building material after said step of forming.

16. The process according to claim 15 wherein said step of heat treating comprises treating with saturated steam.

17. The process according to claim 16 wherein, for gypsum building material with a ratio of calcium sulphate alpha-hemihydrate to substitute of less than about 1:1, said step of heat treating comprises treating with saturated steam under atmospheric pressure at a temperature in a range from about 70° C. to 100° C. for 4 to 8 hours.

18. The process according to claim 16 wherein, for gypsum building material with a ratio of calcium sulphate alpha-hemihydrate to substitute of more than about 1:1, said step of heat treating comprises subjecting said gypsum building material to an autoclave treatment under a pressure of up to about 16 bar and a temperature of up to about 200° C. for 4 to 8 hours.

19. The process according to claim 15 wherein said step of heat treating comprises heating by action of a high-frequency field at a temperature in a range of 70° C. to 100° C.

20. The process according to claim further comprising the step of combining fibers having a reinforcing effect with said mixture after said step of mixing said surfactant foam into said suspension.

21. The process according to claim wherein said step of mixing calcium sulphate alpha-hemihydrate and water includes adding calcium sulphate beta-hemihydrate in a quantity of up to about 30% by weight relative to a quantity of calcium sulphate alpha-hemihydrate.

22. The process according to claim 9 wherein said waste material comprises grinding dust.

* * * * *

UNITED STATES PATENT AND TRADEMARK OFFICE
CERTIFICATE OF CORRECTION

PATENT NO. : 5,227,100
DATED : July 13, 1993
INVENTOR(S) : Koslowski et al.

It is certified that error appears in the above—identified patent and that said Letters Patent is hereby corrected as shown below:

Claim 1, column 5, line 42, erase "surface are greater" and insert --surface area greater--.

Claim 20, column 7, line 3, erase "claim further" insert --claim 1 further--.

Claim 21, column 7, line 7, erase "claim wherein" insert --claim 1 wherein--.

Signed and Sealed this

Fourth Day of October, 1994

Attest:

BRUCE LEHMAN

Attesting Officer    Commissioner of Patents and Trademarks